June 15, 1926.
J. SUNNEN
VALVE LIFTER
Filed Oct. 7, 1924
1,588,504
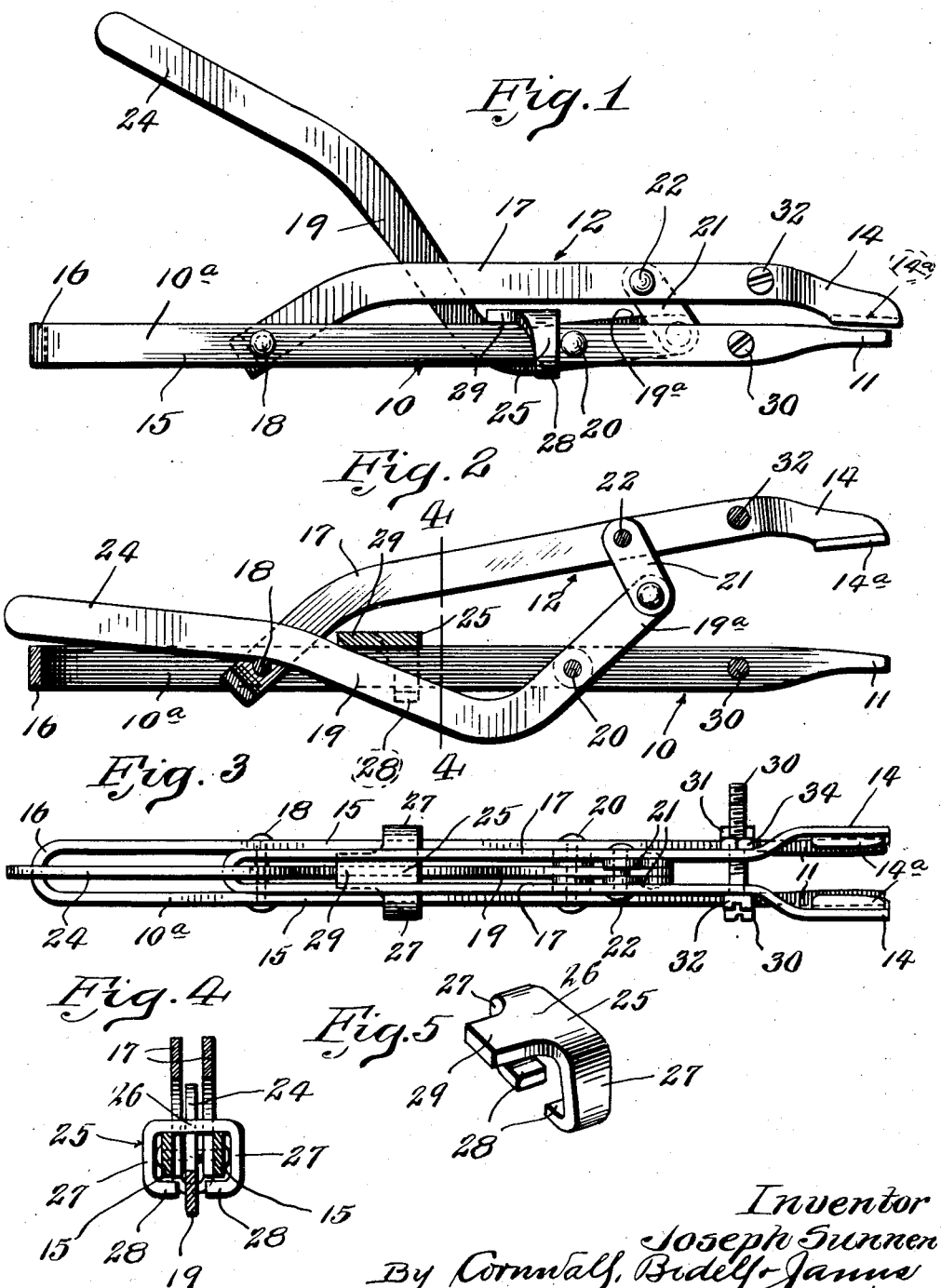

Patented June 15, 1926.

1,588,504

UNITED STATES PATENT OFFICE.

JOSEPH SUNNEN, OF ST. LOUIS, MISSOURI.

VALVE LIFTER.

Application filed October 7, 1924. Serial No. 742,241.

This invention relates to new and useful improvements in valve lifters for engines and the objects of the invention are to provide a valve lifter which is simple and efficient and can be easily and quickly operated.

Further objects of the invention are to provide a valve lifter having an operating lever which is quick-acting and does not require much power to spread the jaws of the valve lifter.

Still further objects of the invention are to provide simple means for locking the lifter in open or extended position.

With these and other objects in view, my invention consists in certain novel features of construction and arrangement of parts, hereinafter more fully described and claimed, and illustrated in the accompanying drawings, in which—

Figure 1 is a side elevational view of the valve lifter showing the jaws thereof in contracted position in readiness to be inserted between the spring and the seat thereof.

Figure 2 is a vertical cross section taken longitudinally through the valve lifter and showing the same in extended position.

Figure 3 is a top plan view of Figure 2.

Figure 4 is a vertical cross section taken on line 4—4 of Figure 2.

Figure 5 is a perspective detail view of the locking member.

The present invention contemplates a valve lifter having a pair of jaw members pivotally connected and designed to have its jaws engage the lower end of the valve spring and the seat thereof, whereby by operating said valve lifter said spring may be compressed and displaced from its seat. These jaw members are operated by a lever fulcrumed in one of the members and having a link connection with the other member and said lever is adapted to be locked in its depressed or operating position by a suitable locking member which is movably arranged on said device.

Referring by numerals to the accompanying drawings, 10 indicates a stationary jaw ing member having jaws 11, and 12 indicates an upper or movable jaw member having jaws 14. Member 10 is preferably formed of a single piece of bar of suitable width and thickness bent to provide two parallel portions 15 united at 16 and having their ends properly shaped to form jaws 11. Member 12 is similarly formed having parallel portions 17 which are bent near their ends laterally in order to space jaws 14 from each other. Each jaw 14 is formed with a longitudinally and inwardly presented flange 14ª which serves as a support for receiving a washer or lower end of the valve spring.

Member 12 has its rear end pivotally connected to member 10 by a pin 18, said pivotal connection being spaced a suitable distance from the rear end of member 10 in order to provide a handle 10ª. A lever 19 is pivotally secured at 20 to member 10 and has its forward end 19ª connected by a link 21 to the forward end of member 12, said link being pivotally connected to the latter by a pin 22. The rear end of said lever extends rearwardly a suitable distance and terminates in a handle 24 which is designed to cooperate with handle 10ª of member 10. Lever 19 is disposed between the parallel portions 15 of member 10 and portions 17 of member 12 and is suitably shaped so as to bring handle 24 in proper relation to handle 10ª whereby they may be conveniently grasped in one hand.

A locking member 25 is slidably positioned on parallel portions 15 between the pivotal points 18 and 20 and said member comprises a transversely disposed portion 26 which lies on the upper edges of said portions and legs 27 which extend downwardly adjacent to the outer sides of said portions 15 and terminate in inwardly bent portions 15 and terminate in inwardly bent portions or extensions 28 which extend under lips or extensions 28 which extend under the bottom edges of said portions and serve to maintain said locking member in position.

A tail piece 29 is formed integral with top portion 26 and extends rearwardly therefrom and is adapted when said lever 19 is depressed and said member 25 is shifted rearwardly to engage the upper edge of the rear end of said lever and lock the latter in depressed position, thereby retaining the jaw members in their extended positions as shown in Figure 2. The inwardly presented portions 28 extend only a short distance inwardly so as not to interfere with the operation of lever 19.

Jaws 11 of member 10 are adjustable laterally by a screw 30 which extends through portions 15 of member 10 and receives a nut 31. By turning this nut in the proper direction the jaws 11 can be expanded or contracted in lateral direction. The jaws 14 of member 12 are adjustable in a similar manner by means of a screw 32 and a nut 34 provided for that portion. This adjustment of the jaws in lateral direction is necessary in view of the fact that the valve springs of various makes of engines vary in their diameters, consequently requiring the jaws to be adjusted accordingly.

Locking member 25 is placed on jaw member 10 before the device is assembled together and is held from displacement on the completed valve lifter by the pivotal mountings 18 and 20. The jaw members are preferably formed of single pieces of material bent to bring the ends of each jaw piece forwardly to form the jaws. This construction not only provides a strong and durable valve lifter but enables the manufacture of valve lifters in an economical manner by permitting the same to be manufactured out of commercial stock without requiring a great amount of machine-work or labor.

While I have shown and described the preferred form of my valve lifter, it will be readily understood that minor changes in the construction and arrangement of parts may be made and substituted, without departing from the scope of my invention.

I claim:—

1. A valve lifter comprising a pair of pivotally connected jaw members, a lever pivotally connected to one of said jaw members at a point intermediate its ends for actuating said jaw members, and a member slidably mounted on one of said jaw members and engageable by said lever to enter into locking engagement with said jaw member, thereby locking said jaws in extended positions.

2. A valve lifter comprising a pair of pivotally connected jaw members, a lever pivotally connected intermediate its ends to one of said members and having one end connected to the other jaw members for actuating said jaw members, and a locking member slidably mounted on one of said jaw members and adapted when engaged by said lever to be wedged against said jaw member and held against displacement, thereby locking said jaw members in operative positions.

3. A valve lifter comprising a pair of pivotally connected jaw members, a lever for actuating said jaw members, and a locking member slidably positioned on one of said jaw members and engageable by said lever for wedging engagement with said jaw member, thereby locking said lever.

4. A valve lifter comprising a pair of pivotally connected jaw members, a lever pivotally mounted on one of said jaw members and in engagement with the other member for moving the latter into extended position, and a locking member slidably mounted on one of said jaw members and movable into engagement with said lever, thereby frictionally interengaging said locking member with said jaw member and retaining said lever in actuated position.

5. A valve lifter comprising a pair of pivotally connected jaw members, a lever pivotally mounted on one of said jaw members and in engagement with the other member, said lever being adapted to move the last-mentioned member into extended position, and a locking member slidably mounted on one of said jaw members and adapted to engage said lever whereby the pressure exerted by said lever against said locking member produces wedging engagement between the latter and said jaw member and locks said jaw members in extended relation.

6. A valve lifter comprising a pair of pivotally connected jaw members, a lever pivotally mounted on one of said jaw members, a link pivotally connecting one end of said lever with the other one of said jaw members, and a locking member movably positioned on one of said jaw members and engageable at one end by the edge of said lever, thereby bringing the other end of said locking member in frictional engagement with the edge of the jaw member on which it is positioned, thus locking the jaws in valve spring engaging position.

7. A valve lifter comprising a stationary jaw member provided with a handle, a movable jaw member fulcrumed on the first jaw member, and a lever pivotally mounted intermediate its ends to said stationary jaw member and connected at its forward end to said movable jaw member for operating the same, the opposite end of said lever forming a handle for cooperating with the handle of the stationary jaw member.

8. A valve lifter comprising a stationary jaw member provided with a handle, a movable jaw member fulcrumed on the first jaw member, a lever pivotally mounted in said stationary jaw member and connected at one end to said movable jaw member for operating the same, the opposite end of said lever forming a handle for cooperating with the handle of the stationary jaw member, and a member slidably arranged on said stationary jaw member and movable into engagement with said lever for locking it in actuating position.

9. A valve lifter comprising a stationary jaw member provided with a handle, a movable jaw member fulcrumed on the first jaw member, a lever pivotally mounted in said stationary jaw member and connected at one end to said movable jaw member for operating the same, the opposite end of said lever forming a handle for cooperating with the handle of the stationary jaw member, and means for adjusting the jaws of each jaw member in lateral direction.

10. A valve lifter comprising a stationary jaw member provided with a handle, a movable jaw member fulcrumed on the first jaw member, a lever pivotally mounted in said stationary jaw member and connected at one end to said movable jaw member for operating the same, the opposite end of said lever forming a handle for cooperating with the handle of the stationary jaw member, means for adjusting the jaws of each jaw member in lateral direction, and a locking member slidably arranged on said stationary member for locking the jaw members in extended position.

In testimony whereof I hereunto affix my signature this 3rd day of October, 1924.

JOSEPH SUNNEN.